(12) United States Patent
Kim et al.

(10) Patent No.: US 8,988,982 B2
(45) Date of Patent: Mar. 24, 2015

(54) METHOD AND APPARATUS FOR PROTECTION SWITCHING IN POINT-TO-MULTIPOINT NETWORK

(71) Applicant: Electronics and Telecommunications Research Institute, Daejeon (KR)

(72) Inventors: Daeub Kim, Daejeon (KR); Jeong-dong Ryoo, Daejeon (KR); Taesik Cheung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 170 days.

(21) Appl. No.: 13/649,708

(22) Filed: Oct. 11, 2012

(65) Prior Publication Data

US 2013/0128720 A1    May 23, 2013

(30) Foreign Application Priority Data

Nov. 18, 2011  (KR) ........................ 10-2011-0121113

(51) Int. Cl.
| | | |
|---|---|---|
| H04L 12/24 | (2006.01) | |
| H04L 12/707 | (2013.01) | |
| H04L 12/26 | (2006.01) | |
| H04L 12/703 | (2013.01) | |
| H04L 12/753 | (2013.01) | |
| H04L 12/761 | (2013.01) | |

(52) U.S. Cl.
CPC ............ *H04L 45/22* (2013.01); *H04L 43/0817* (2013.01); *H04L 45/28* (2013.01); *H04L 45/48* (2013.01); *H04L 45/16* (2013.01)
USPC ......................................... 370/218; 370/221

(58) Field of Classification Search
None
See application file for complete search history.

(56) References Cited

U.S. PATENT DOCUMENTS

| | | | |
|---|---|---|---|
| 7,039,436 B1 * | 5/2006 | Kakehi ........................ | 455/525 |
| 7,522,599 B1 | 4/2009 | Aggarwal et al. | |
| 7,558,219 B1 | 7/2009 | Aggarwal et al. | |
| 7,564,803 B1 | 7/2009 | Minei et al. | |
| 7,590,115 B1 | 9/2009 | Aggarwal et al. | |
| 7,738,388 B2 * | 6/2010 | Cheung et al. ................ | 370/248 |
| 7,801,137 B2 * | 9/2010 | Vasseur et al. ................ | 370/390 |
| 8,004,960 B2 | 8/2011 | Raj | |
| 2002/0021659 A1 | 2/2002 | Meijen et al. | |
| 2004/0136372 A1 | 7/2004 | Gruia | |
| 2004/0213256 A1 | 10/2004 | Muys et al. | |
| 2005/0036442 A1 * | 2/2005 | Saleh et al. ................... | 370/216 |
| 2007/0253327 A1 * | 11/2007 | Saha et al. .................... | 370/218 |
| 2008/0123521 A1 | 5/2008 | Vasseur et al. | |
| 2008/0123524 A1 | 5/2008 | Vasseur et al. | |
| 2008/0298803 A1 | 12/2008 | Warner et al. | |

(Continued)

OTHER PUBLICATIONS

ITU-T, G.8031/Y.1342, Ethernet linear protection switching, published on Jun. 2011.*

*Primary Examiner* — Hassan Kizou
*Assistant Examiner* — Tejis Daya
(74) *Attorney, Agent, or Firm* — Nelson Mullins Riley & Scarborough LLP

(57) ABSTRACT

A method of performing protection switching in a network including a first node and a plurality of second nodes that are connected to the first node is provided. The first node counts the number of obstacles that have occurred in a plurality of paths that are connected between the plurality of second nodes, and if the counted number is smaller than a predetermined threshold value, the first node performs protection switching per leaf. Alternatively, if the counted number is equal to or larger than a predetermined threshold value, the first node performs protection switching per tree.

17 Claims, 13 Drawing Sheets

(56) References Cited

U.S. PATENT DOCUMENTS

| | | |
|---|---|---|
| 2008/0304407 A1 | 12/2008 | Umansky et al. |
| 2009/0073988 A1* | 3/2009 | Ghodrat et al. .......... 370/395.53 |
| 2009/0185478 A1 | 7/2009 | Zhang |
| 2009/0219806 A1 | 9/2009 | Chen et al. |
| 2010/0208593 A1 | 8/2010 | Soon et al. |
| 2010/0214909 A1 | 8/2010 | Ceccarelli et al. |
| 2010/0260197 A1* | 10/2010 | Martin et al. ................. 370/408 |
| 2011/0090783 A1* | 4/2011 | Huang .......................... 370/217 |
| 2013/0058210 A1* | 3/2013 | Natarajan et al. ............. 370/228 |

* cited by examiner

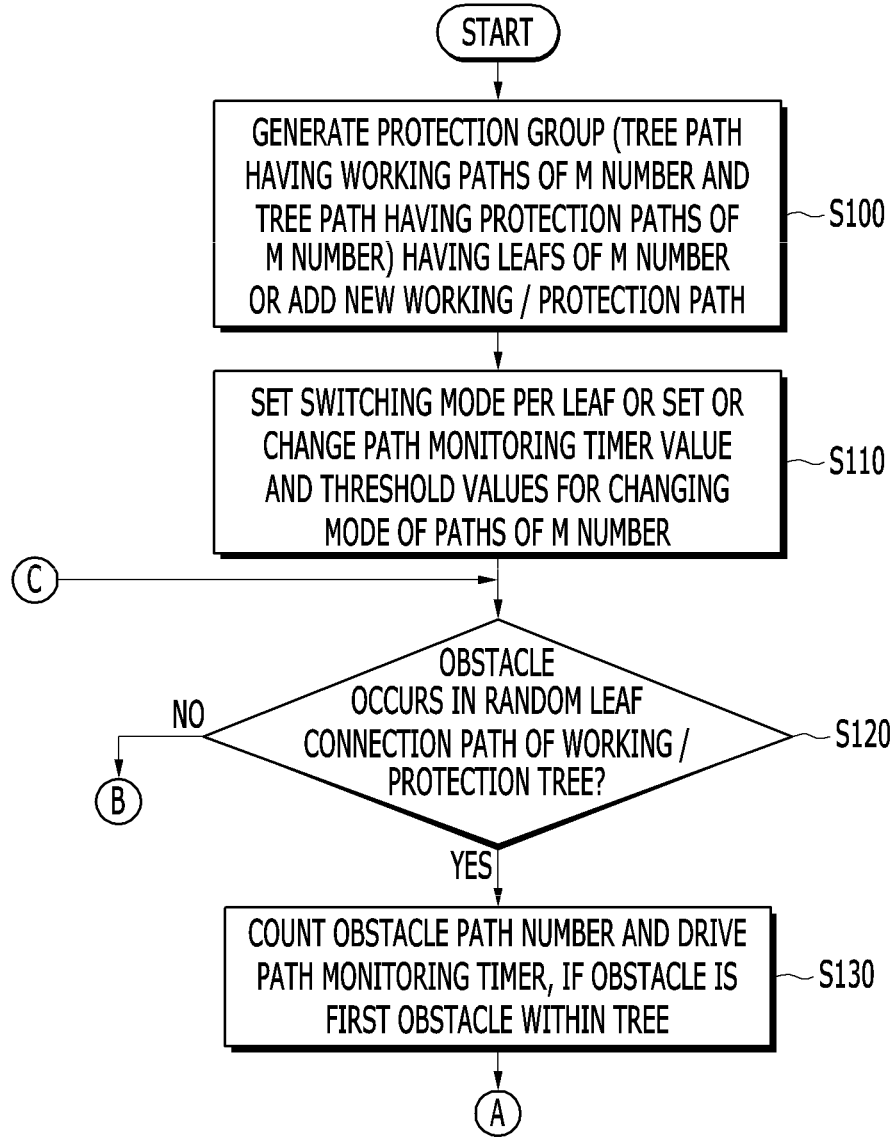

METHOD AND APPARATUS FOR PROTECTION SWITCHING IN POINT-TO-MULTIPOINT NETWORK

CROSS-REFERENCE TO RELATED APPLICATION

This application claims priority to and the benefit of Korean Patent Application No. 10-2011-0121113 filed in the Korean Intellectual Property Office on Nov. 18, 2011, the entire contents of which are incorporated herein by reference.

BACKGROUND OF THE INVENTION (a) Field of the Invention

The present invention relates to a method and apparatus for protection switching. More particularly, the present invention relates to a method and apparatus for protection switching in a point-to-multipoint network.

(b) Description of the Related Art

Protection switching is a method of most quickly resuming traffic when traffic is stopped as an obstacle occurs in a network. Protection switching is classified into linear protection switching and ring protection switching according to topology of a network, and the linear protection switching is classified again into 1+1, 1:1, 1:N, or M:N protection switching.

A basic protection switching method is a method of setting another traffic path (hereinafter referred to as a "protection path") between end points in order to protect a traffic path (hereinafter referred to as a "working path") between end points with a 1+1 method. In this method, a transmitting terminal normally transmits traffic using both a working path and a protection path, and a receiving terminal receives traffic from a working path and selects a protection path and receives traffic when an obstacle occurs in the working path. The protocol is simple in this method, but half of a network resource is wasted for a protection path.

The 1:1 method allocates one protection path for one working path, as in the 1+1 method. However, this method normally transmits traffic using only a working path and uses a protection path when an obstacle has occurred in the working path. Because the protection path may be normally used for transferring less important traffic that does not require protection switching, the 1:1 method is more efficient than the 1+1 method.

The M:N method allocates M number of protection paths in order to protect N number of working paths. This method is an invented method in order to use a network resource more efficiently than the 1:1 method, and when M is smaller than N, efficiency thereof increases. However, the M:N method can protect traffic of obstacles of the M number or fewer in the N number of working paths.

The 1:N method is a special case where M=1 in the M:N method, and an operation principle of the 1:N method is the same as that of the M:N method.

Such a linear protection switching method is applied to protection switching in a point-to-point network, sets a working path and a protection path to not meet for traffic that is transmitted in a bi-direction or one direction between points, and in the method, traffic is normally transmitted to the working path, and when an obstacle occurs in the working path, or according to an operator's instruction, traffic is transmitted to the protection path.

In a point-to-multipoint point network, a ring protection switching method is generally used. Therefore, it is difficult to use an existing linear protection switching method in a rooted multipoint connection network.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for protection switching having advantages of fast protection switching in a point-to-multipoint network of a rooted multipoint connection form.

An exemplary embodiment of the present invention provides a method of performing protection switching in a network including a first node and a plurality of second nodes that are connected to the first node, the method including: counting the number of obstacles that have occurred in a plurality of paths that are connected between the first node and the plurality of second nodes; performing protection switching per leaf if the counted number is smaller than a predetermined threshold value; and performing protection switching per tree if the counted number is equal to or larger than a predetermined threshold value.

The method may further include: driving a path monitoring timer; and comparing the counted number with the threshold value before driving of the path monitoring timer has expired. The protection switching per leaf or the protection switching per tree may be performed after the path monitoring timer has expired.

The counting of the number may include performing protection switching per leaf for the occurred obstacle after counting the number of obstacles that have occurred.

The counting of the number may include: monitoring whether an obstacle occurs per path that is connected to each of the plurality of second nodes and acquiring a local request per second node; acquiring a far end request according to occurrence of an obstacle from each of the plurality of second nodes; and counting the number of obstacles that have occurred according to the local request or the far end request.

Another embodiment of the present invention provides a method of performing protection switching in a network including a first node and a plurality of second nodes that are connected to the first node, and in which a working tree path and at least one protection tree path are formed between the first node and each of the second nodes and in which the working tree path includes a plurality of working paths and in which the protection tree path includes a plurality of protection paths.

The method includes: driving a path monitoring timer and counting the number in which an obstacle has occurred in a plurality of paths that are connected between the first node and the plurality of second nodes; performing, if the counted number while the path monitoring timer is being driven is smaller than a predetermined threshold value, protection switching per leaf by driving a protection switch corresponding to a second node corresponding to a path in which the obstacle has occurred in a multiple protection switch including protection switches for performing protection switching per second node; and performing, if the counted number while the path monitoring timer is being driven is equal to or larger than a predetermined threshold value, when driving of the path monitoring timer has expired, protection switching per tree that switches a tree path comprising a path in which the obstacle has occurred using a representative protection switch to another tree path.

The representative protection switch may be a protection switch that is set for protection switching per tree among protection switches that perform protection switching per second node that is included in the multiple protection switch. Alternatively, the representative protection switch may be a multiple protection switch that is formed separately from the multiple protection switch.

Yet another embodiment of the present invention provides a method of performing protection switching in a network including a first node and a plurality of second nodes that are connected to the first node, the method including: counting the number of obstacles that have occurred in a plurality of paths that are connected between the first node and the plurality of second nodes; maintaining the first switching mode when a present protection switching mode is a first switching mode that performs protection switching per leaf, if the counted number is smaller than a preset first threshold value; converting, when a present protection switching mode is a first switching mode that performs protection switching per leaf, if the counted number is equal to or larger than the first threshold value, the present protection switching mode to a second switching mode that performs protection switching per tree; maintaining the second switching mode when a present protection switching mode is a second switching mode that performs protection switching per tree, if the counted number is equal to or larger than a preset second threshold value; and converting, when a present protection switching mode is a second switching mode that performs protection switching per tree, if the counted number is smaller than the second threshold value, the present protection switching mode to a first switching mode that performs protection switching per leaf.

The first threshold value and the second threshold value may be the same or different.

Yet another embodiment of the present invention provides a protection switching apparatus in a network including a first node and a plurality of second nodes that are connected to the first node.

The protection switching apparatus includes: a local state monitoring unit that monitors a state of each of a plurality of paths that are connected per second node and that detects whether an obstacle occurs and that outputs a local request according to occurrence of an obstacle; a multiple local priority determination unit that performs a local priority logic step for a plurality of local requests that are output per second node and that selects and outputs a local request having a top priority order per second node; a far end state monitoring unit that monitors whether a message according to each protection switching report is transmitted from the second node and that outputs a far end request according to a message that is received per second node; and a plurality of multiple global priority determination units that compare an input far end request or a local request having a top priority order with a global request having a present top priority order, and that output a request having a higher priority order as a comparison result as a global request having a top priority order for performing protection switching and that correspond to each of the second nodes. Each multiple global priority determination unit may receive and process a local request and a far end request that are input from a corresponding second node.

The local request and the far end request may include information about a path in which an obstacle has occurred, and the global request may include information about a path to perform protection switching.

The plurality of multiple global priority determination units corresponding to each of a plurality of second nodes in which an obstacle has occurred may operate to switch a path in which an obstacle has occurred per second node to another path, when a present protection switching mode is a first switching mode that performs protection switching per leaf.

One multiple global priority determination unit of a plurality of multiple global priority determination units may be set as a representative global priority determination unit. The representative global priority determination unit may operate to switch a tree path including a path in which the obstacle has occurred to another corresponding tree path, when a present protection switching mode is a second switching mode that performs protection switching per tree.

The protection switching apparatus may further include a representative global priority determination unit that switches a tree path including a path in which an obstacle has occurred to another corresponding path, when a present protection switching mode is a second switching mode that performs protection switching per tree.

BRIEF DESCRIPTION OF THE DRAWINGS

FIGS. 3A and 3B are flowcharts illustrating a method of performing protection switching according to an exemplary embodiment of the present invention.

DETAILED DESCRIPTION OF THE EMBODIMENTS

Figure 1:
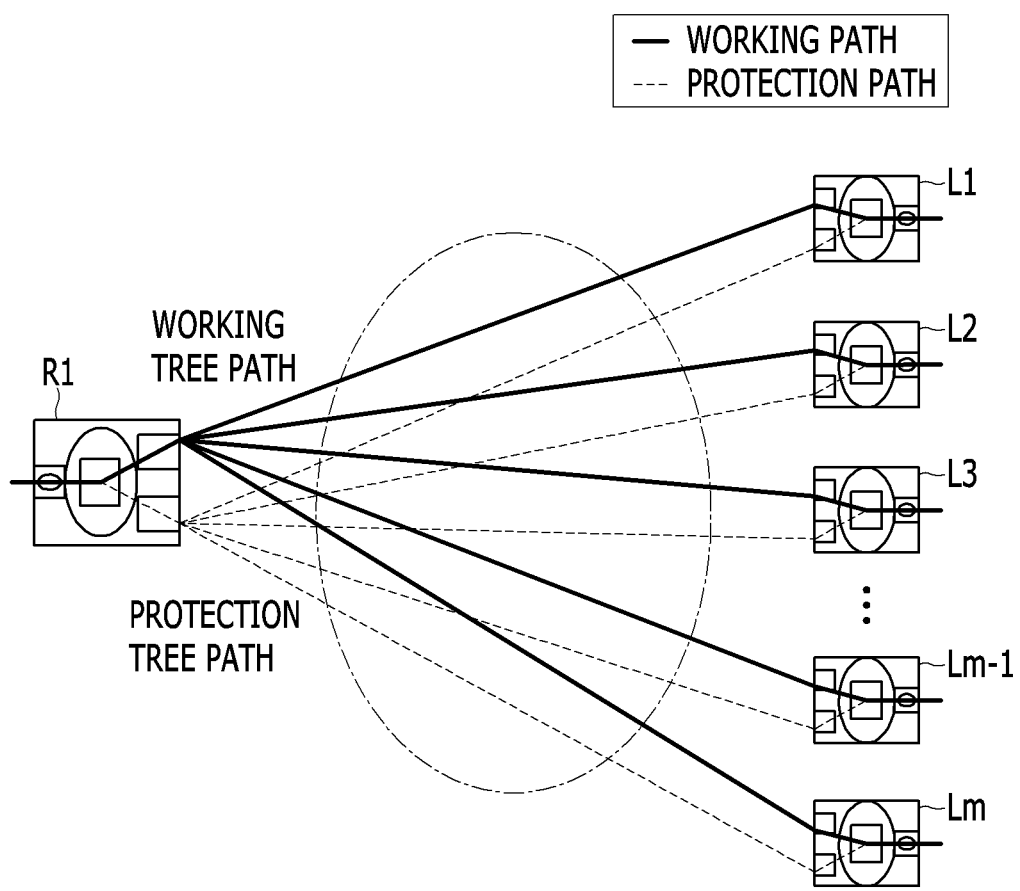
FIG. 1 is a diagram illustrating an example of a point-to-multipoint network to which a protection switching method is applied according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements.

Hereinafter, a method and apparatus for protection switching in a point-to-multipoint network according to an exemplary embodiment of the present invention will be described.

FIG. 1 is a diagram illustrating an example of a point-to-multipoint network to which a protection switching method is applied according to an exemplary embodiment of the present invention.

As shown in FIG. 1, a root node R1 is connected to a plurality of leaf nodes L1-Lm through paths for transmitting data. The root node R1 communicates with the leaf nodes L1-Lm through such a point-to-multipoint path, and the leaf nodes do not generally communicate with each other. Such a connection method is referred to as a rooted multipoint connection method. Here, a path indicates a transfer path, a virtual tunnel, an exclusive network, a virtual channel, and connection in which a packet is transferred from a starting point to a destination of the packet in a network (e.g., Ethernet, a packet network, and a packet transfer network).

A point-to-multipoint path between a root node and a plurality of leaf nodes may be set and managed as a tree path form. Two tree paths are necessary for protection switching. One path is a working tree path, and another path is a protection tree path. The working tree path and the protection tree path are a set of tree paths, and the working tree path includes a plurality of working paths, while the protection tree path includes a plurality of protection paths. When an obstacle occurs in the working tree path, traffic is most quickly switched to a protection tree path in which an obstacle does not occur and thus communication is resumed. Here, an obstacle that causes protection switching includes signal fail (SF) in which transfer of traffic is completely stopped, and signal degrade (SD) in which some traffic is transferred and that causes an obstacle in communication due to bad quality.

As shown in FIG. 1, when a working tree path of a tree form is set for point-to-multipoint multicast/broadcast communication as well as point-to-point unicast communication between the root node R1 and the plurality of leaf nodes L1-Lm, a protection tree path for protecting the working tree path is formed in a tree form like a working tree path. Intermediate nodes (not shown) that are positioned between the root node R1 and the leaf nodes L1-Lm are distinguished and set so that the working path and the protection path may be protected even by a random error and complete a pair of network tree settings for protection switching.

A working tree path and a protection tree path that are formed in a tree form should be basically able to be set to correspond to each other in a point-to-point method, and all working tree paths and all protection tree paths should be able to set so that a point-to-multipoints may correspond to each other.

In such a network environment, traffic downstream from a root node R1 to leaf nodes L1-Lm is processed in a multicast traffic form as well as a unicast traffic form, and traffic upstream from a leaf node R1 to root nodes L1-Lm is processed in a unicast traffic form. Here, communication between leaf nodes is not considered.

In the working tree path and the protection tree path, the root node R1 and the leaf nodes L1-Lm include a maintenance entity group end point (MEP). The MEP senses a state of a path and senses whether a state of SF or SD occurs through operation, management, and maintenance (OAM)/continuous check message (CCM) processing.

In point-to-point communication, similar to a 1:1 or 1+1 protection switching method, an MEP is formed to correspond to the number of used leaf nodes at both ends of a working path/protection path, and each leaf node includes an MEP of the same form as that of point-to-point communication. The root node includes an MEP that increases proportionally with the number of connected leaf nodes, for example, when the number of connected leaf nodes is m, the root node includes an MEP that is larger by a maximum of m times than the leaf node.

In this way, an MEP, which is both end nodes that are connected to the edge, i.e., of a point-to-point connection, provides an OAM function that can transmit traffic to a protection path or a working path having no obstacle according to whether an obstacle of a working path or a protection path (or an operator's instruction) that can transmit traffic exists when traffic is introduced into a protection area. Such an MEP is a management function that is necessary for an apparatus that detects occurrence of an obstacle and that performs protection switching.

Figure 2:
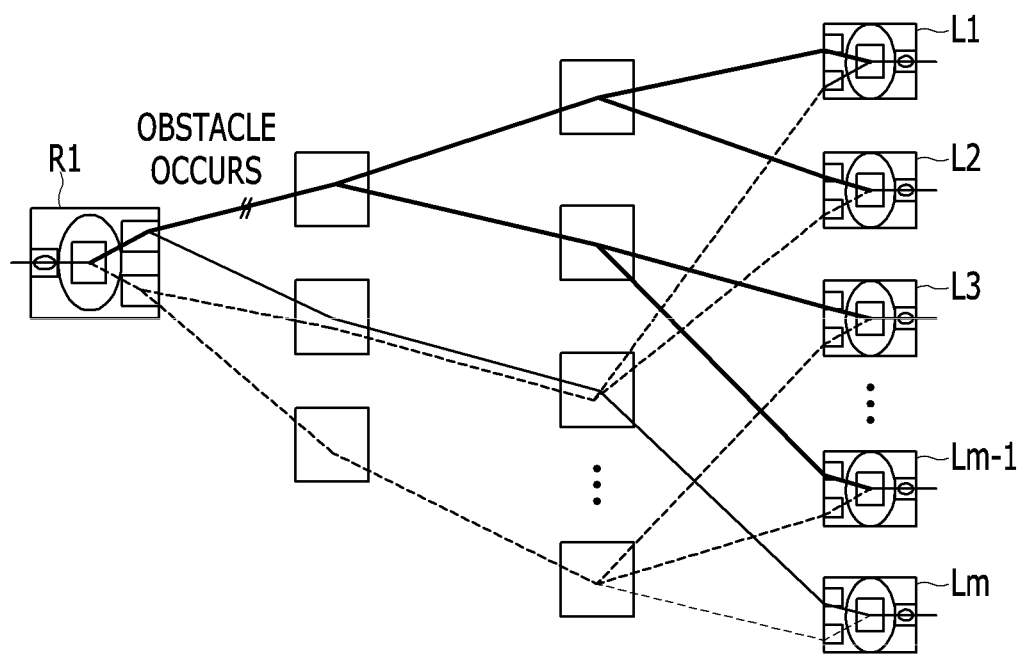
FIG. 2 is a diagram illustrating an example of a case where an obstacle occurs in a point-to-multipoint network according to an exemplary embodiment of the present invention.

FIG. 2 is a diagram illustrating an example of a case where an obstacle occurs in a point-to-multipoint network according to an exemplary embodiment of the present invention.

In a point-to-multipoint network of a rooted multipoint connection form, when an obstacle occurs in a path that is connected to a root node, the root node should perform much protection switching at the same time and thus a processing load of the root node may sharply increase. For example, as shown in FIG. 2, when an obstacle, for example, an SF, occurs in a branch adjacent to a root node R1 that is connected to a plurality of leaf nodes L1-Lm, SFs may be simultaneously detected in a path that is connected to each of a leaf node L1 to a leaf node Lm−1 existing in a working tree path that is indicated by a solid line. In such a case, in order to protect communication with many leaf nodes at one time, protection switching should be simultaneously performed to a protection tree path that is indicated by a dotted line. Accordingly, many processing loads that the root node R1 cannot process within a short time may be generated.

In an exemplary embodiment of the present invention, in a point-to-multipoint network of a rooted multipoint connection form, point-to-multipoint linear protection switching having unicast and multicast traffic attributes is performed. Particularly, in an exemplary embodiment of the present invention, when obstacles of a predetermined number or more simultaneously occur in paths that are formed in a root node and a plurality of leaf nodes or when an obstacle occurs in a connection cable adjacent to a root node having many leaf nodes, faster protection switching can be performed.

In such an exemplary embodiment, an example of a network may be various networks such as Ethernet, carrier Ethernet, an Ethernet passive optical network (E-PON), a gigabit-PON (G-PON), a provider backbone bridge traffic engineering (PBB-TE) network, a multiprotocol label switching (MPLS) network, a transport profile (MPLS-TP) network, and communication between a wireless terminal and an access point.

With reference to protection switching according to an exemplary embodiment of the present invention, when an obstacle occurs in a working path, i.e., a working path per leaf among branches of a tree in a working tree path, which is a path set of a tree form to be a management target, all working tree paths are not switched to a protection tree path, and switching per leaf of a protection path corresponding to a working path per leaf in which an obstacle has occurred is performed. That is, similarly to protection switching in a point-to-point network, switching is performed to a protection path corresponding to only a branch. Further, when an obstacle has occurred in working paths of the preset number or more, instead of performing switching per leaf, switching per tree that switches all working tree paths in which an obstacle has occurred to another protection tree path is performed. When a path in which an obstacle has occurred is a working path (e.g., an upper level branch) adjacent to a root node, because of a network characteristic of a tree form, an obstacle is simultaneously detected in many leaf nodes that are connected to a low level branch, and it may be detected that many obstacles have occurred in a working path per leaf at one time in a root node, and the number of obstacles that have occurred in such a case may be equal to or larger than a preset number. Therefore, switching per tree can be performed.

Here, a mode that performs switching per leaf is referred to as a switching mode per leaf or a first switching mode, and a method of performing protection switching per leaf is referred to as a first protection switching method. Further, a mode that performs switching per tree is referred to as a switching mode per tree or a second switching mode, and a method of performing protection switching per tree is referred to as a second protection switching method.

When the number of all leaf nodes that are entirely managed in a root node is m, a preset number (e.g., m/2 or more) may be set as a threshold value. If a number of obstacles that is equal to or larger than a threshold value occur within a predetermined period in leaf nodes in which a root node manages within a specific time period, protection switching per tree is performed, and if a number of obstacles that is smaller than a threshold value occur, protection switching per leaf is performed. Further, protection switching per tree or protection switching per leaf may be performed according to a user request, and one of the two methods may be exclusively used. A user command (e.g., MS, FS, Lockout, and EXER) may be operated separately from an obstacle, and a switching mode per tree and a switching mode per leaf may be selectively used according to a user intention.

A threshold value that is used for converting a switching mode per leaf to a switching mode per tree while operating in the switching mode per leaf or a threshold value that is used for converting a switching mode per tree to a switching mode per leaf while operating in the switching mode per tree may be the same or different. For example, a first threshold value toTree for converting from a switching mode per leaf to a switching mode per tree and a second threshold value toLeaf for converting from a switching mode per tree to a switching mode per leaf may be the same or different.

First, a method of performing protection switching according to an exemplary embodiment of the present invention will be described.

Figure 3B:
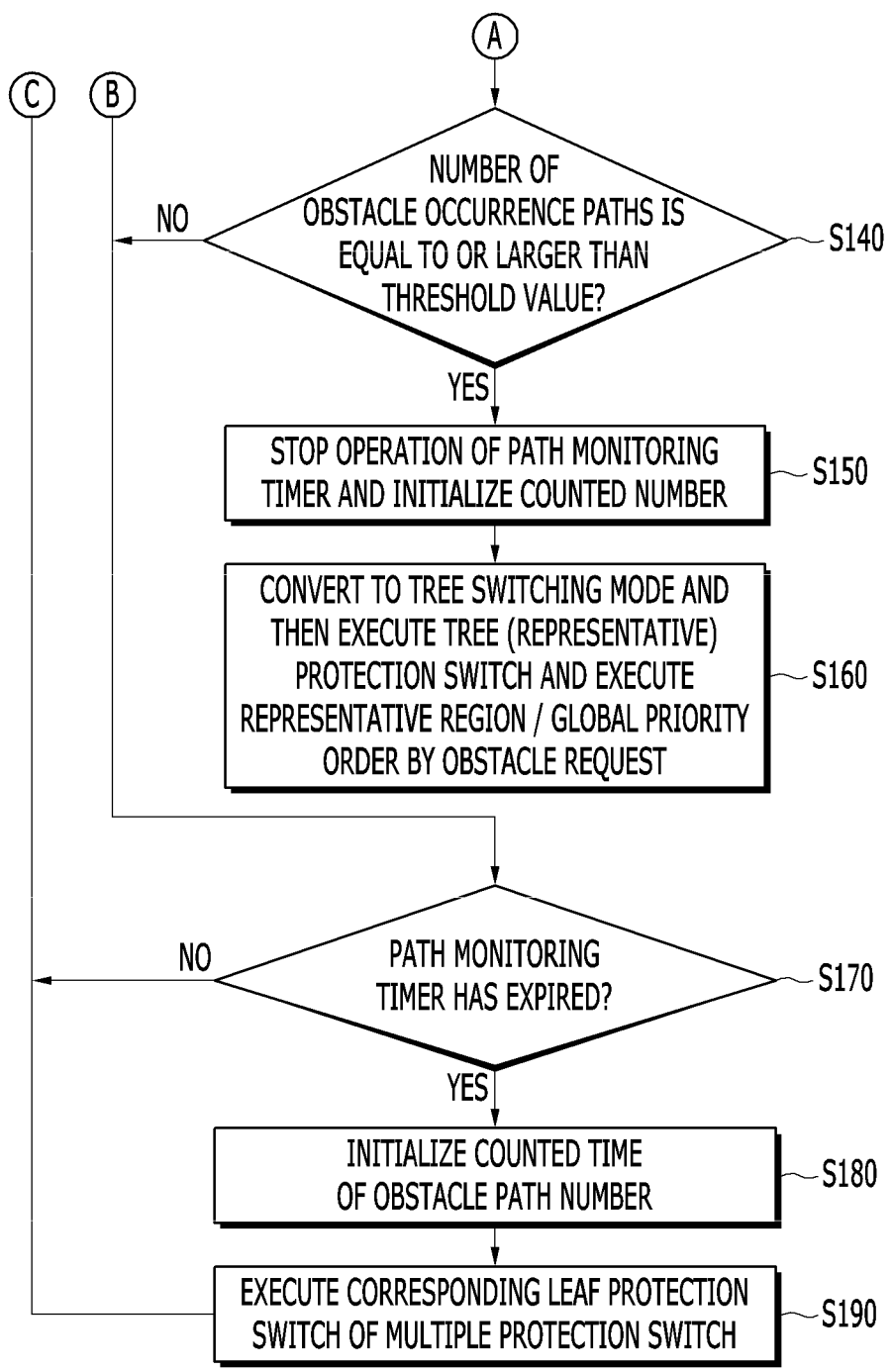

FIGS. 3A and 3B are flowcharts illustrating a method of performing protection switching according to an exemplary embodiment of the present invention. Particularly, FIGS. 3A and 3B are flowcharts illustrating a method of performing protection switching of selectively performing protection switching per leaf and protection switching per tree by monitoring a path that is connected to a root node and a leaf node in a point-to-multipoint communication network.

In an exemplary embodiment of the present invention, a path monitoring timer for determining simultaneity and frequency of obstacles that occur in a path between a leaf node and a root node is used. By monitoring an obstacle state per leaf node for a time that is set by the path monitoring timer, the number of obstacle occurrence paths is counted, and in this case, a working path and a protection path are distinguished and counted. Here, a timer value of a path monitoring timer may be set so that a branch of all trees satisfies switching performance, for example, 50 ms.

A protection group includes a plurality of connection paths that are connected to leaf nodes of the m number, a work tree path that is formed in a tree form, and a plurality of protection paths corresponding to a connection path that is connected to leaf nodes of the m number, and generates a protection tree path that is formed in a tree form as an object for protection switching. Alternatively, such a working tree path and protection tree path are added to an already generated protection group (S100).

It is initially set whether to exclusively use one mode or to use two modes of a switching mode per leaf in parallel and switching the mode per tree. When two modes are used in parallel, a threshold value is set as a reference value for change to protection switching per tree and protection switching per leaf for paths of the M number, and a path monitoring timer value for counting the number of obstacles that has occurred during a specific time period is set (S110). Here, a threshold value includes a first threshold value toTree for converting from a switching mode per leaf to a switching mode per tree, and a second threshold value toLeaf for converting from a switching mode per tree to a switching mode per leaf. Here, it is assumed that a threshold value is one. However, the present invention is not limited thereto. Further, it is assumed that a switching mode per leaf is first set.

In such a state, when an obstacle occurs in a random path that is connected to a leaf node among a working tree path or a protection tree path (S120), the number of obstacle occurrence paths is counted. Specifically, when an occurred obstacle is a first obstacle, while a path monitoring timer is being driven, the number of obstacle occurrence paths is counted. When the path monitoring timer has already been driven, only the number of obstacle occurrence paths is counted (S130).

The counted number of the obstacle occurrence paths and a threshold value (here, a first threshold value toTree) for converting a mode are compared (S140).

If the number of obstacle occurrence paths is equal to or larger than a threshold value, it is determined that an obstacle has occurred at one time in a plurality of paths and a conversion from a present switching mode per leaf to a switching mode per tree is performed. For this purpose, after operation of a path monitoring timer is stopped and the counted number is initialized (S150), a switching mode per leaf is converted to a switching mode per tree, and a switching mode according to the converted protection switching per tree is performed (S160).

If an obstacle does not occur in paths of a threshold value or more within a specific monitoring period, a switching mode per leaf is maintained. Specifically, if the number of obstacle occurrence paths is smaller than a threshold value at step S140, it is determined whether a path monitoring timer has expired (S170). If a path monitoring timer has not expired, detection of whether an obstacle occurs is continued. If a path monitoring timer has expired, the counted number of obstacle paths is initialized, and protection switching per leaf is performed in a path in which an obstacle has occurred according to a switching mode per leaf (S180 and S190).

In a method of performing protection switching according to an exemplary embodiment of the present invention, when an obstacle occurs in a path that is connected to a random leaf node, before a path monitoring timer has expired, if the number of obstacle occurrence paths is smaller than a threshold value, protection switching per leaf is immediately performed in the connected path. That is, a processor of a corresponding leaf node among processors that perform protection switching per leaf node can be activated. Specifically, in the above method of performing protection switching, an obstacle is detected and counting is performed (S130), the counting number is compared with a threshold value (S140), and if the number of obstacle occurrence paths is smaller than a threshold value, protection switching per leaf is immediately performed according to occurrence of an obstacle, and switching time delay may be prevented for a monitoring period. In this case, when a path monitoring timer has expired, the counted number of obstacle paths until that time is initialized, and protection switching per leaf is additionally not performed.

Hereinafter, a method of performing protection switching per node will be described.

In a state in which a transfer path, i.e., a working path and a protection path is formed in a tree form between the root node and MEPs that are included in each of a plurality of leaf nodes, a protection switching event that should perform protection switching, such as detection of an obstacle in a path that is formed between the root node and the leaf node or reception of a command that instructs to perform protection switching by an operator, may occur. Further, the root node or the leaf node may receive a protection switching report that notifies occurrence of an obstacle from another node or requests protection switching.

Here, both direct detection of an obstacle of a path by a leaf node or a root node and a user instruction are referred to as a local request, and a protection switching request according to a message that is received from another node is referred to as a far end request. Determination of a priority order of a plurality of local requests is referred to as a local priority logic step, and determination of a priority order of a local request and a far end request is referred to as a global priority logic step.

Here, it is assumed that a priority order is already provided to each of a local request and a far end request, and a priority order of a far end request or a local request is determined according to a priority order and thus a final protection switching state is determined.

A message that is transmitted/received for a protection switching report between nodes, for example, an automatic protection switching (APS) message, is used, and communication of an APS message is transparently performed between each leaf node and root node via an MEP. Here, the APS message may include information (e.g., a number of working paths, an obstacle of a working path or a protection path, or a user command state) about a working path in which an obstacle has occurred. The APS message that is transmitted from a root node to one leaf node is transmitted according to unicast communication or multicast communication, and an APS message that is transmitted from a leaf node to a root node is generally transmitted according to unicast communication.

First, a method and apparatus for performing protection switching in a leaf node will be described.

Figure 4:
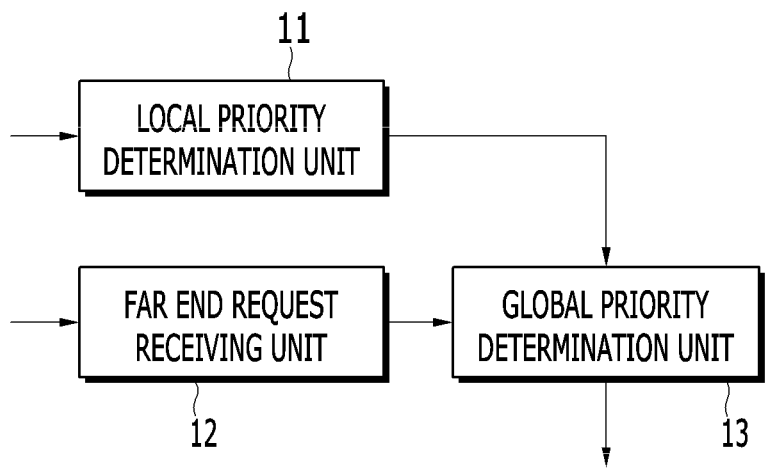
FIG. 4 is a block diagram illustrating a structure of an apparatus that performs protection switching in a leaf node according to an exemplary embodiment of the present invention.
Figure 5:
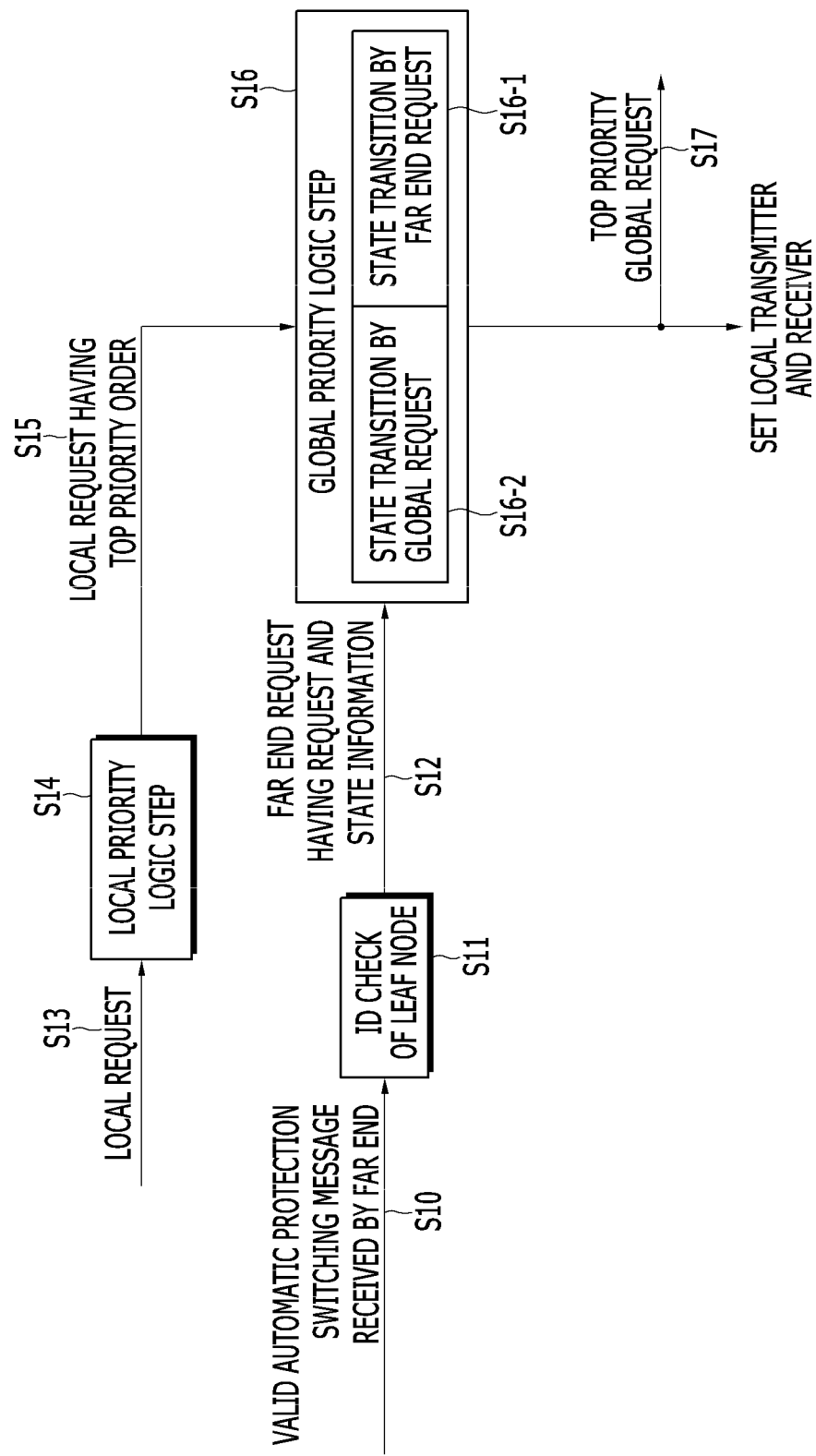
FIG. 5 is a flowchart illustrating a process of performing protection switching in a leaf node according to an exemplary embodiment of the present invention.

FIG. 4 is a block diagram illustrating a structure of an apparatus that performs protection switching in a leaf node according to an exemplary embodiment of the present invention, and FIG. 5 is a flowchart illustrating a process of performing protection switching in a leaf node according to an exemplary embodiment of the present invention.

As shown in FIG. 4, the protection switching apparatus 10 of a leaf node according to an exemplary embodiment of the present invention includes a local priority determination unit 11, a far end request receiving unit 12, and a global priority determination unit 13.

The local priority determination unit 11 receives an input of local requests according to a local obstacle that has occurred in each path that is connected to a corresponding leaf node, determines a priority order of the input local requests, and outputs a local request having a top priority order.

The far end request receiving unit 12 receives a message that instructs to perform protection switching from another node, i.e., a root node. When the received message is a multicast message, the far end request receiving unit 12 checks whether ID that is included in the message is the same as ID of a corresponding leaf node, and if the received message is a muticast message, the far end request receiving unit 12 does not perform a separate ID check. If the received message is a unicast message, one normal message is received by each node, and if the received message is a multicast message, several messages are received together by each node and thus the node ID check is necessary. The far end request receiving unit 12 determines whether the received message is effective and outputs a far end request according to the received message.

The global priority determination unit 13 receives an input of a local request (hereinafter, for better comprehension and ease of description, referred to as a "top priority local request") having a top priority order that is input from the local priority determination unit 11 or a far end request that is input from the far end request receiving unit 12. The global priority determination unit 13 compares the input request (a top local request or a far end request) with a global request having a present top priority order. Here, a global request having a present top priority order represents a global request in which protection switching is performed according to an existing obstacle request.

When comparing a global request having a present top priority order and a top priority local request or a far end request, a request having a higher priority order is output as a global request having a top priority order (referred to as a top priority global request). Hereinafter, protection switching is performed according to such a top priority global request. Such a top priority global request includes information about a path to perform protection switching.

A method in which a leaf node performs protection switching based on the protection switching apparatus 10 that is formed in such a structure will now be described.

The leaf node receives a message, for example an APS message that instructs to perform protection switching from a root node, which is a far end (S10).

The leaf node selectively performs an ID check of the received message. The APS message that is transmitted from the root node to one leaf node is transmitted according to unicast communication or multicast communication.

The leaf node selectively performs an ID check of the received message (S11). If the received message is a unicast message, the received message includes a destination address and thus validity of the received message is determined without a separate ID check. If the received message is a multicast message, in order for the leaf node to determine whether the received message is a message that is transmitted thereto, the leaf node checks whether the ID that is included in the received message is the same as the ID thereof. If the ID that is included in the received message is the same as the ID thereof, the leaf node determines validity of the received message. After a validity check is first executed, the ID check may be performed.

A far end request is acquired based on a message that passes through selective ID check and validity determination (S12). Such a far end request represents an obstacle state of a path in which an obstacle has occurred, and includes a request and state information that requests protection switching.

Here, the request and state information may include a number of a path in which an obstacle has occurred and an occurred obstacle kind.

The leaf node checks whether a new local request occurs according to occurrence of a local obstacle (S13), and when a new local request occurs, the leaf node performs the local priority logic step and selects a local request having a top priority order (S14 and S15).

Next, the leaf node performs the global priority logic step for a top priority local request or a far end request (S16). That is, the leaf node compares a global request having a present top priority order with a priority order of a top priority local request or a far end request, performs a state transition process according to a comparison result, and determines a top global request and a state.

If the far end request has a higher priority order than the global request having a present top priority order, the leaf node performs state transition by the far end request (S16-1), and if a top local request has a higher priority order than the global request having a present top priority order, the leaf node performs state transition by a local request (S16-2). Both state transitions may be performed.

A top priority global request and state are determined by such a state transition process. For example, if a far end request becomes a top priority global request according to state transition by a far end request, the leaf node performs protection switching to a protection path corresponding to an operation path in which an obstacle has occurred according to a request and state information that is included in a far end request (S17).

Hereinafter, a method and apparatus for performing protection switching in a root node will be described.

Figure 6:
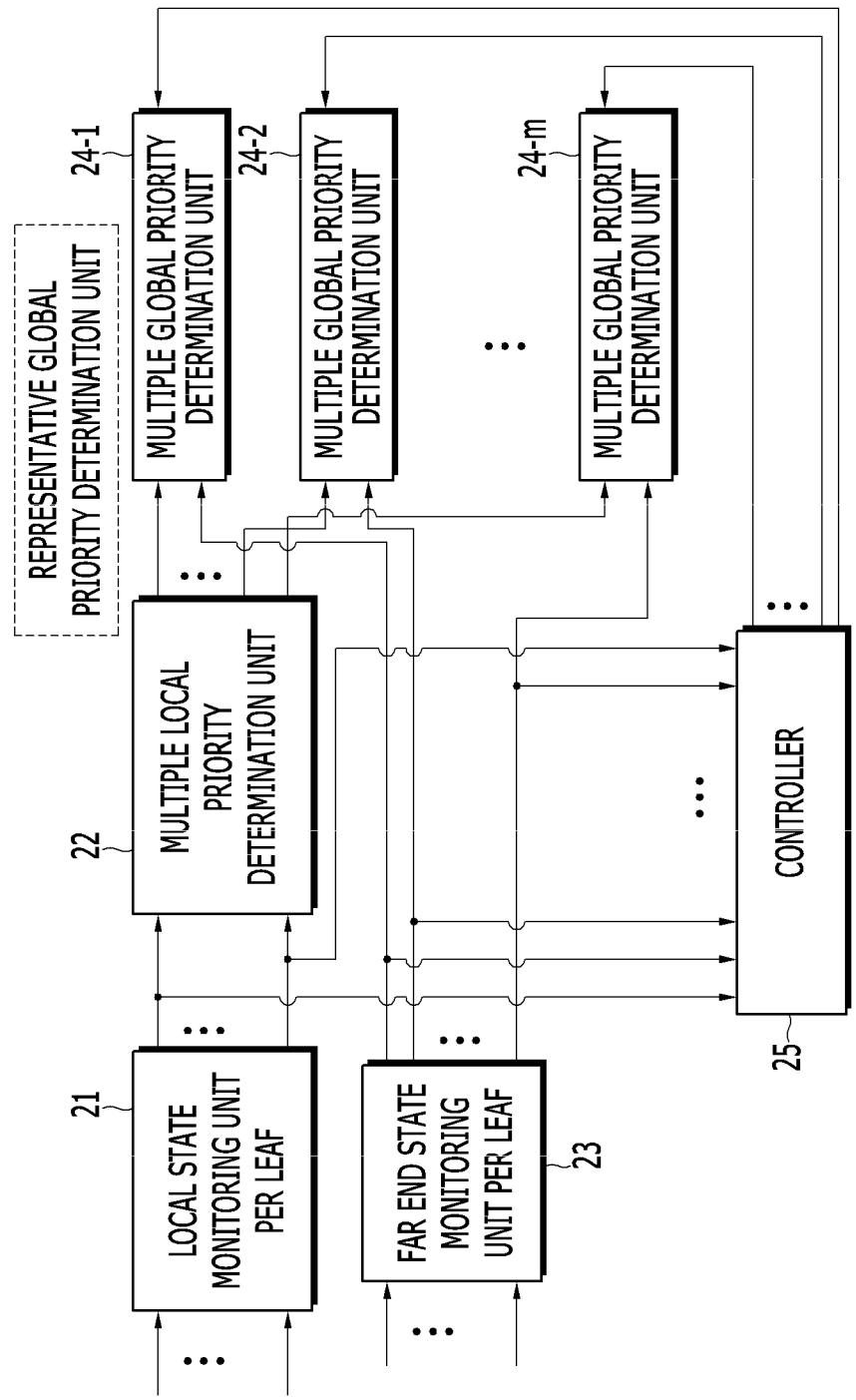
FIG. 6 is a block diagram illustrating a structure of an apparatus that performs protection switching in a root node according to an exemplary embodiment of the present invention.

FIG. 6 is a block diagram illustrating a structure of an apparatus that performs protection switching in a root node according to an exemplary embodiment of the present invention.

As shown in FIG. 6, a protection switching apparatus 20 of a root node according to an exemplary embodiment of the present invention includes a local state monitoring unit per leaf 21, a multiple local priority determination unit 22, a far end state monitoring unit per leaf 23, and a plurality of multiple global priority determination units 24-1, 24-2, . . . , 24-m, and further includes a controller 25.

The local state monitoring unit per leaf 21 detects whether an obstacle occurs in a plurality of paths that are connected to the root node and a plurality of leaf nodes, and particularly, detects occurrence of an obstacle by monitoring a state of each of a plurality of paths that are connected per leaf node. When an obstacle occurs, the local state monitoring unit per leaf 21 outputs a corresponding local request.

The multiplex local priority determination unit 22 determines a priority order of local requests per leaf node that are output from the local state monitoring unit per leaf 21. That is, the local priority logic step of a plurality of local requests that are output per leaf node is performed, and a local request having a top priority order per leaf node is selected and output. When a present state is converted to a switching mode per tree through monitoring of a local state and a far end state, one of representative local requests for switching per tree is output to a representative global priority determination unit.

The far end state monitoring unit per leaf 23 monitors whether a message according to each protection switching report is transmitted from a far end, i.e., a plurality of leaf nodes that are connected to the root node, and outputs a far end request according to the received message. A far end request per leaf node is output. Here, the local state monitoring unit per leaf 21 and the far end state monitoring unit per leaf 23 determine simultaneous obstacle occurrence of a local request and a far end request, determine a conversion reference between a switching mode per leaf and a switching mode per tree, and share information for normal protection switching.

The plurality of multiple global priority determination units 24-1, 24-2, . . . , and 24-m each compare an input local request having a top priority order or a far end request with a global request having a present top priority order, and output a request having a higher priority order as a global request having a top priority order as a comparison result.

Each multiple global priority determination unit performs the global priority logic step of a far end request or a local request having a top priority order corresponding to the leaf node. For example, the multiple global priority determination unit 24-1 receives an input of a top priority local request that is generated to correspond to a leaf node 1 or a far end request according to a message that is received from the leaf node 1 and performs the global priority logic step, and the multiple global priority determination unit 24-2 receives an input of a top priority local request that is generated to correspond to a leaf node 2 or a far end request according to a message that is received from the leaf node 2 and performs the global priority logic step. Such a plurality of multiple global priority determination units may be referred to as a multiple protection switch.

A multiple global priority determination unit of such a plurality of multiple global priority determination units 24-1, 24-2, . . . , and 24-m may be set as a representative global priority determination for protection switching per tree. In this case, when protection switching per tree is performed, a multiple global priority determination unit that is set as a representative global priority determination unit operates and performs protection switching per tree. In this case, the remaining multiple global priority determination units that are not set do not participate in performing of protection switching and store a finally input local request or far end request.

Alternatively, in addition to a plurality of multiple global priority determination units 24-1, 24-2, . . . , and 24-m, a separate representative global priority determination unit (indicated by a dotted line in FIG. 5) for performing protection switching per tree may be added. In this case, when protection switching per tree is performed, an additionally embodied representative global priority determination unit performs protection switching per tree. The remaining multiple global priority determination units may maintain a newest state by an input local request and a far end request, but do not participate in protection switching of the node. Such a representative global priority determination unit may be referred to as a representative protection switch.

The controller 25 counts the obstacle occurrence number according to a request that is output from the local state monitoring unit per leaf 21 and the far end state monitoring unit per leaf 23, operates a path monitoring timer for counting obstacle occurrence, and sets a protection switching mode to a first switching mode that performs protection switching per leaf or a second switching mode that performs protection switching per tree based on the counted obstacle occurrence number. Here, the controller 25 is illustrated as an individual element from other constituent elements, but the controller 25 may be embodied in a form that is included in the local state monitoring unit per leaf 21 or the far end state monitoring unit per leaf 23.

The root node performs protection switching per leaf or protection switching per tree through a process of counting the number of obstacles that have occurred within a preset time and comparing the counted obstacle occurrence path number with a predetermined threshold value using the above-described protection switching method based on a protection switching apparatus having such a structure.

Hereinafter, a process in which a root node performs protection switching will be described.

Figure 7A:
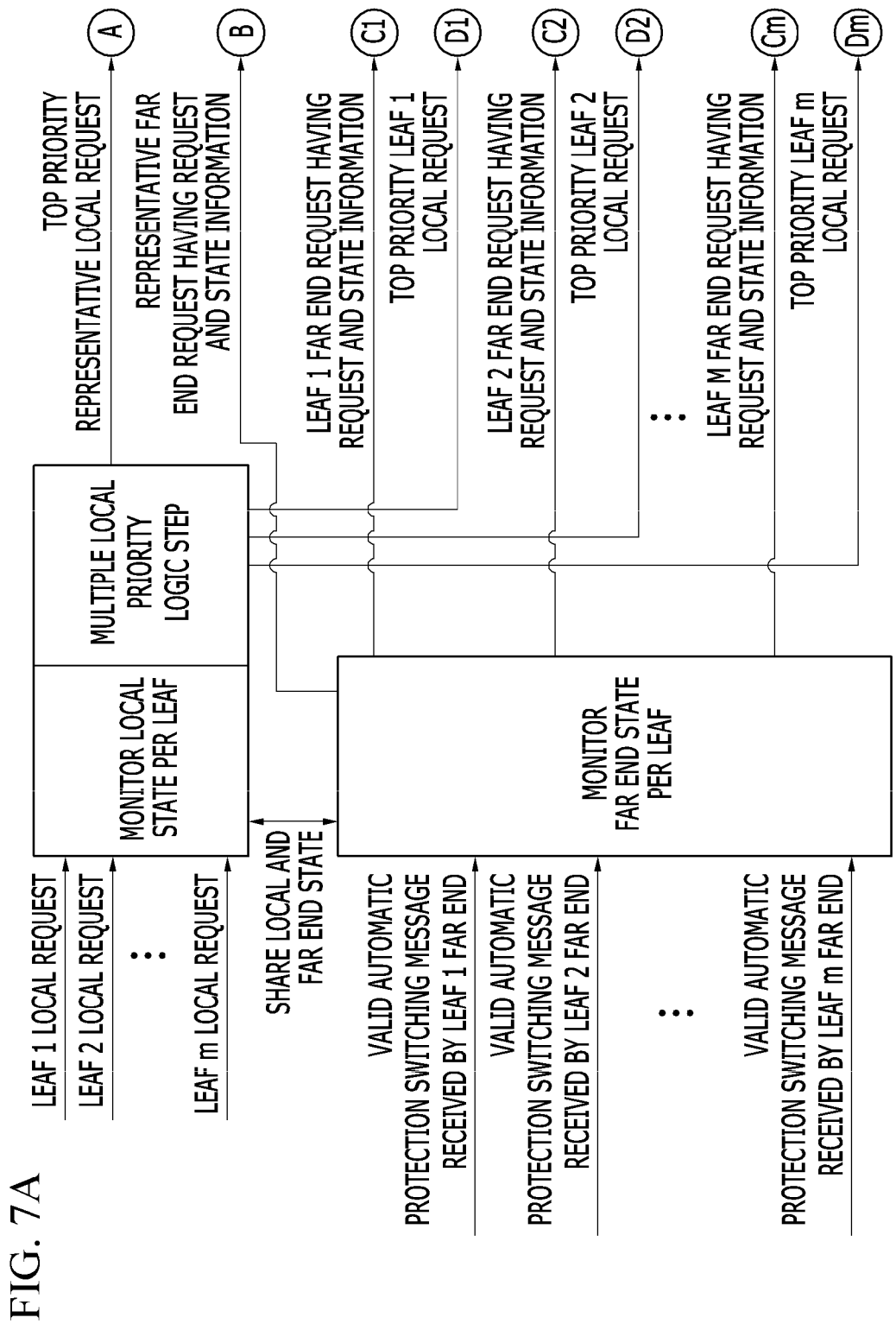
FIGS. 7A and 7B are diagrams illustrating a process of performing protection switching in a root node according to an exemplary embodiment of the present invention.
Figure 7B:
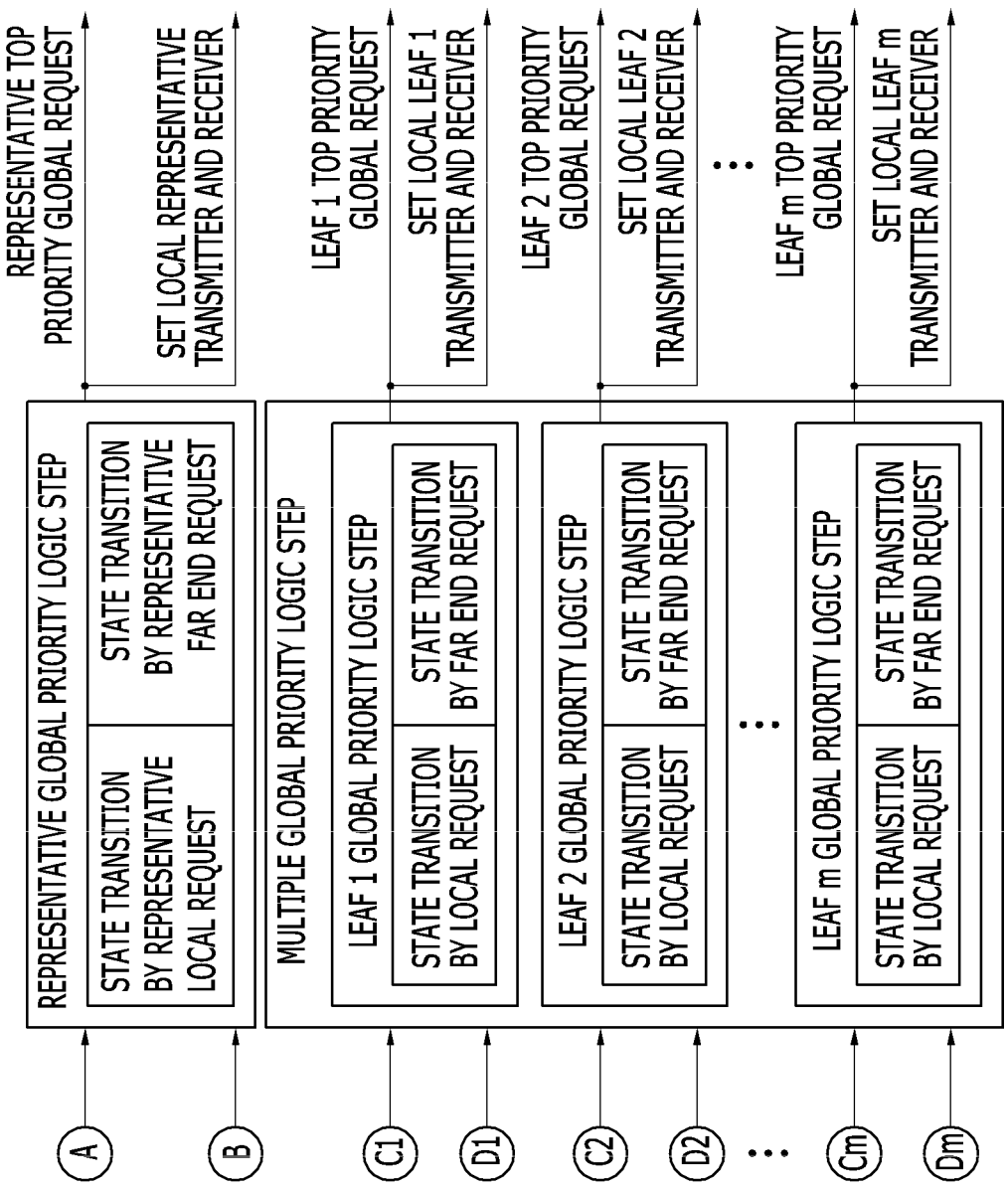
Figure 8A:
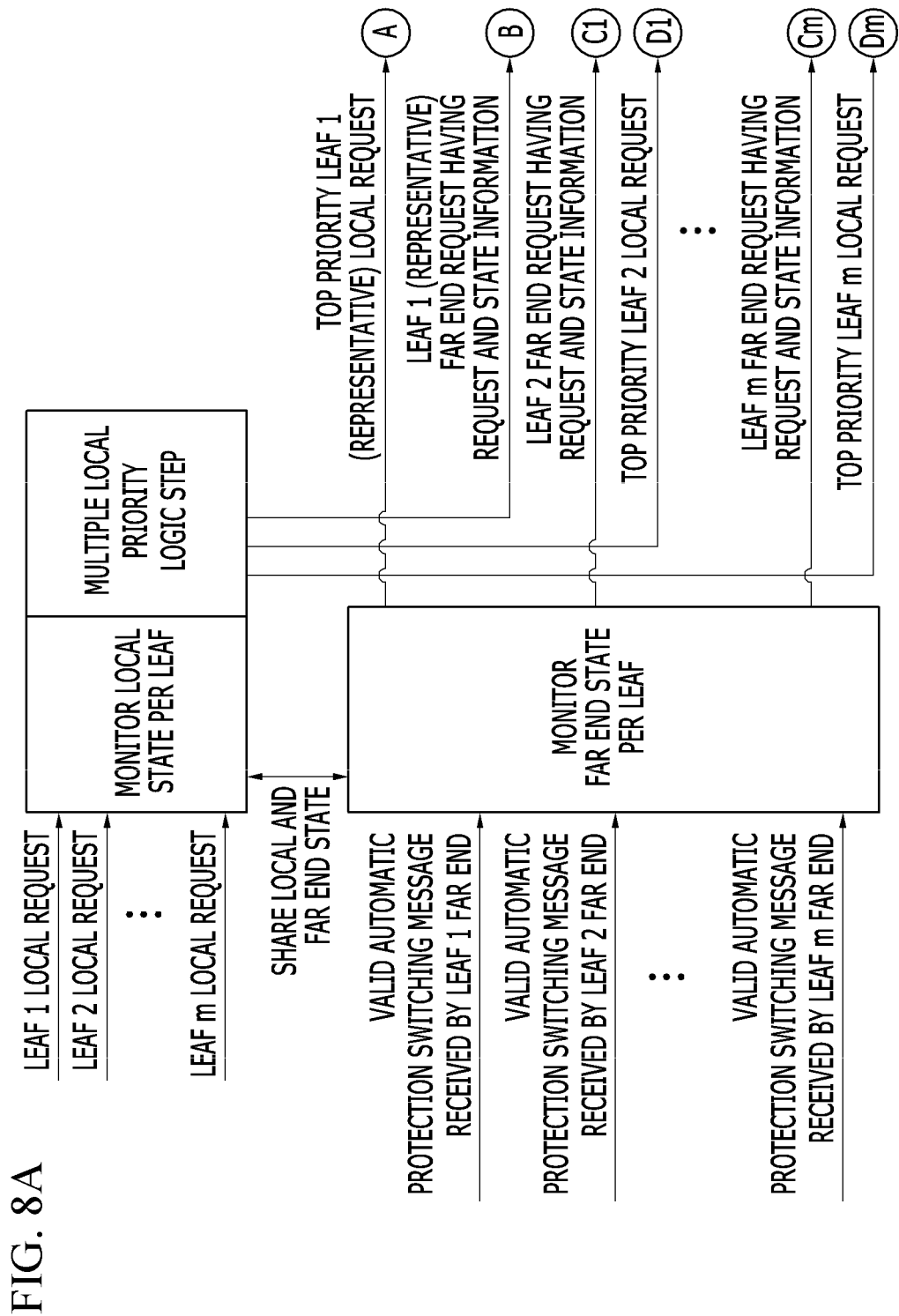
FIGS. 8A and 8B are diagrams illustrating another process of performing protection switching in a root node according to an exemplary embodiment of the present invention.
Figure 8B:
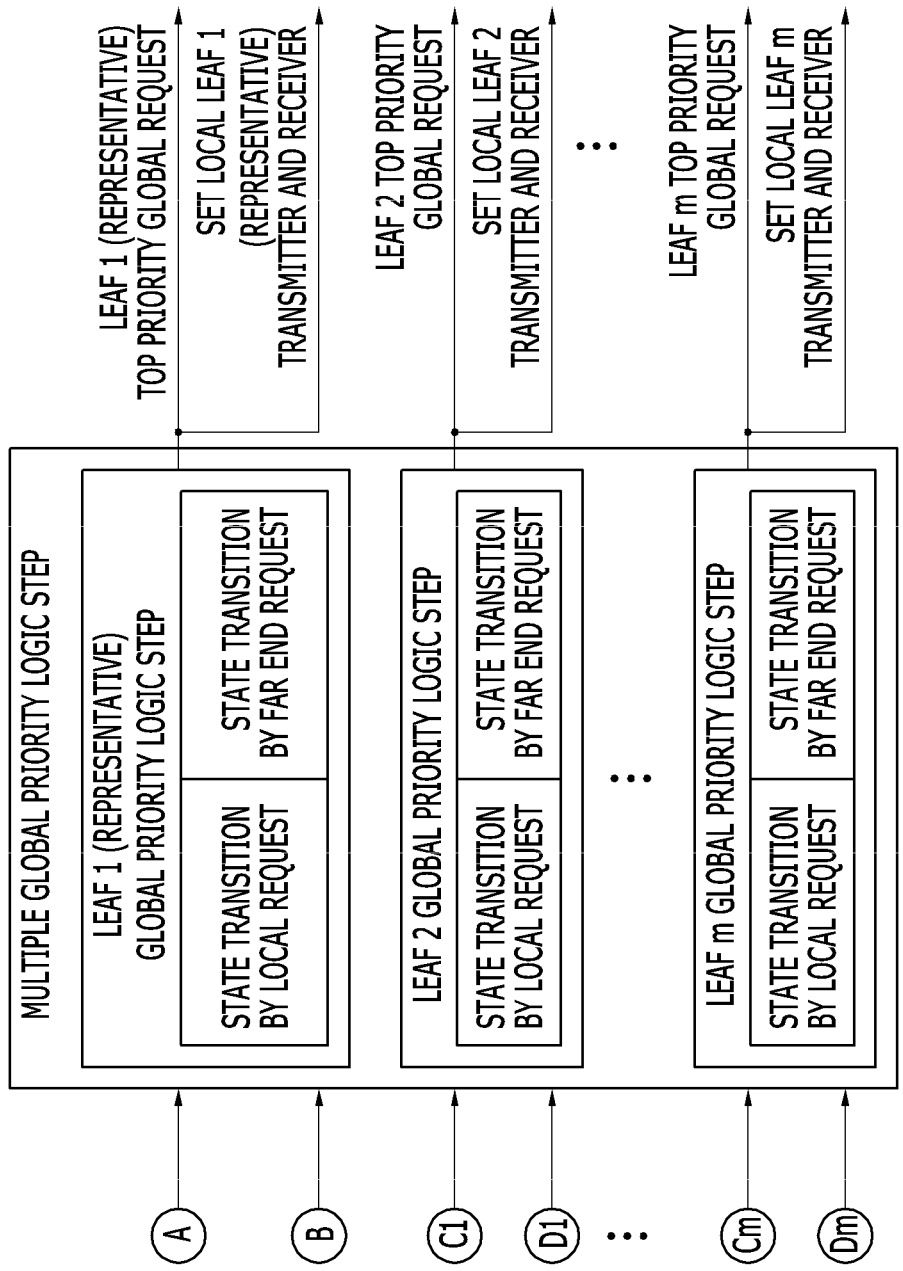
Figure 9A:
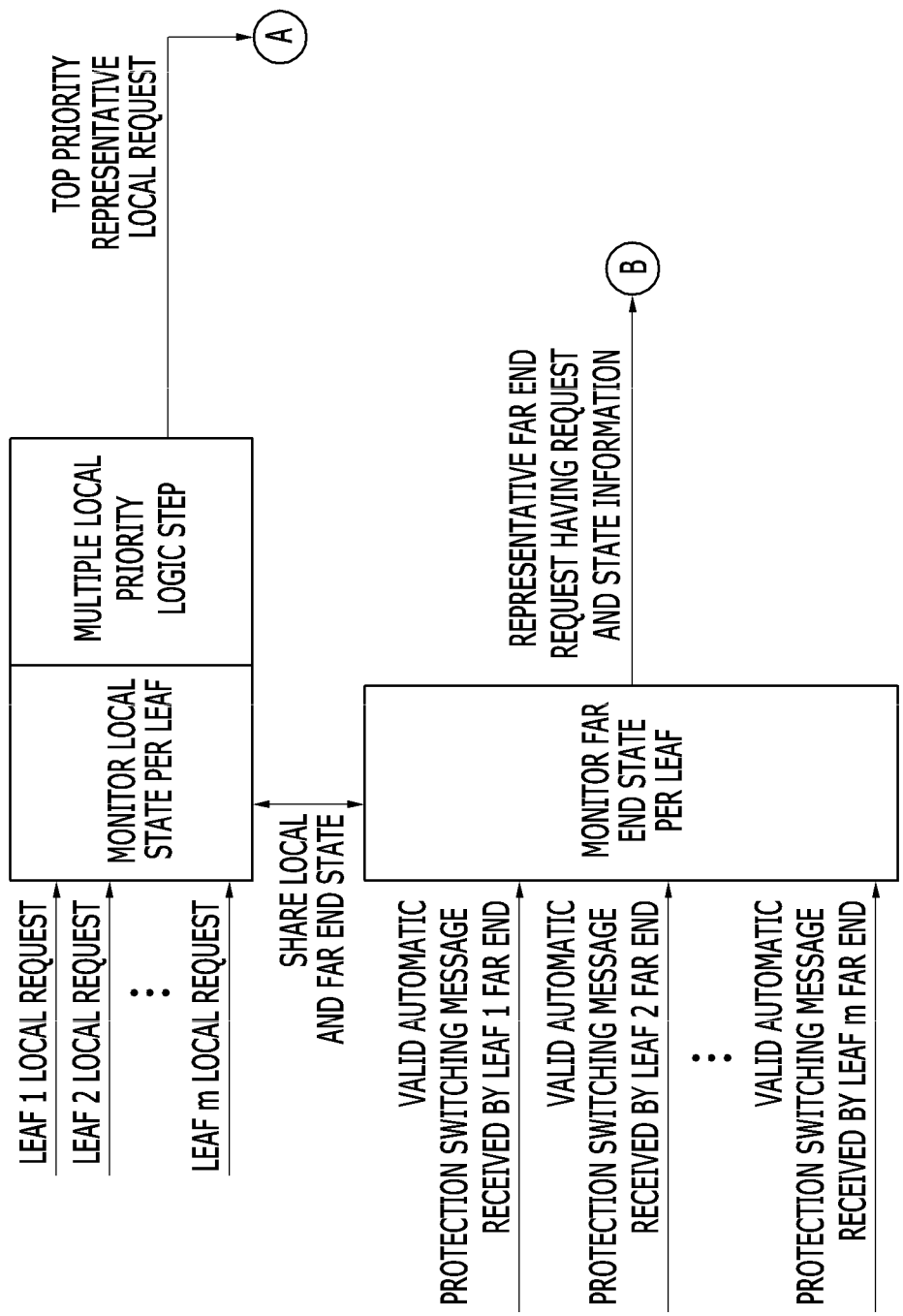
FIGS. 9A and 9B are diagrams illustrating a process of performing protection switching per tree in a root node according to an exemplary embodiment of the present invention.
Figure 9B:
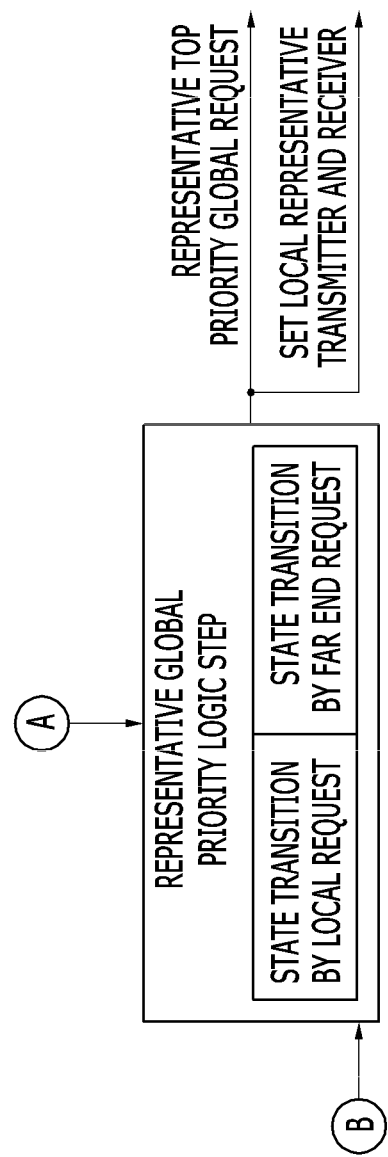

FIGS. 7A and 7B are diagrams illustrating a process of performing protection switching in a root node according to an exemplary embodiment of the present invention. FIGS. 8A and 8B are diagrams illustrating another process of performing protection switching in a root node according to an exemplary embodiment of the present invention. FIGS. 9A and 9B are a diagram illustrating a process of performing protection switching per tree in a root node according to an exemplary embodiment of the present invention.

As shown in FIGS. 7A and 7B, the root node performs protection switching per leaf by performing each multiple global priority logic step per leaf node and performs protection switching per tree by performing separately embodied a representative global priority logic step. Further, in another form, the root node performs protection switching per leaf by performing each multiple global priority logic step per leaf node, as shown in FIGS. 8A and 8B. The root node selects one of multiple global priority logic steps as a representative global priority logic step, and performs protection switching per tree by performing the selected representative global priority logic step. In FIGS. 8A and 8B, "representative" is separately displayed in the multiple global priority logic step that is set as a representative global priority order.

First, as shown in FIGS. 8A and 8B, when protection switching performs per leaf, while the multiple global priority logic step per leaf node is being performed, protection switching per leaf is performed.

Specifically, the root node monitors whether a local obstacle occurs by monitoring a plurality of paths that are connected per leaf node, and if a local obstacle occurs, the root node generates a local request. The root node performs the multiple local priority logic step for a local request that is generated per leaf node. That is, the root node determines a priority order of local requests that are generated in one leaf node and selects a top priority local request. According to such multiple local priority logic step per leaf node, a local request having a top priority order per leaf node may be selected.

Further, the root node monitors whether a message according to a protection switching report is received from a plurality of connected leaf nodes. If a message is received, the root node checks plurality validity of the received message, extracts request/state information, which is obstacle occurrence related information from a message that is determined as a valid message, and acquires a far end request. Such far end requests may be acquired per leaf node.

The root node performs plurality multiple global priority logic steps per leaf node. The root node performs plurality global priority logic step for a far end request or a top priority local request per leaf node. That is, the root node compares a top priority local request or a far end request that is input per leaf node with a global request having a present top priority order, and outputs a request having a higher priority order as a comparison result as a global request having a top priority order.

In this way, while plurality local priority logic step and plurality global priority logic step are being performed per leaf node in a root node, the root node may switch a path in which an obstacle has occurred per leaf node to a protection path.

For example, when protection switching is performed in a leaf node 1, while plurality local priority logic step is being performed by a local request that is generated in a path that is connected to the leaf node 1, a top priority local request is selected for the leaf node 1. Alternatively, a far end request is acquired according to a message that is transmitted from the leaf node 1. By performing plurality multiple global priority logic step to the leaf node 1 based on such a top priority local request or a far end request, a global request of a top priority order for the leaf node 1 is determined, and protection switching for the leaf node 1 is performed according to the determined global request.

While protection switching is being performed for such a leaf node 1, the root node may equally perform protection switching to other leaf nodes through the above process.

Hereinafter, a process in which a root node performs protection switching per tree will be described.

When protection switching per tree is performed, while a separately embodied representative global priority logic step is being performed, protection switching per tree is performed, as shown in FIGS. 7A and 7B. Alternatively, as shown in FIGS. 8A and 8B, while a multiple global priority logic step that is set as representative is being performed among multiple global priority logic steps per leaf node, protection switching per tree is performed.

FIGS. 9A and 9B are diagrams illustrating a process of performing such a representative global multiple logic step or protection switching per tree in a root node according to an exemplary embodiment of the present invention.

When obstacles of a threshold value or more occur in paths that are connected to each leaf node for a monitoring period that is set by a path monitoring timer, protection switching per tree is performed.

As shown in FIGS. 9A and 9B, a top priority representative area request is determined through plurality local state monitoring per leaf node and the multiple local priority logic step, and while representative global priority logic is being driven, all corresponding tree paths are protection-switched to another tree path. Further, a representative far end request having request and state information is determined through plurality far end state monitoring per leaf node, and while the representative global priority logic step is being driven, protection switching per tree is performed.

Here, the representative global priority logic step may be a separately embodied representative global priority logic step, as shown in FIGS. 7A and 7B, or a logic step that is set as representative among a plurality of multiple global priority logic steps, as shown in FIGS. 8A and 8B. In this case, only the representative global priority logic step operates to perform protection switching per tree, and the remaining multiple global priority logic steps, except for the representative global priority logic step, may not be performed. The remaining multiple global priority logic steps may store a finally input local request and far end request.

According to an exemplary embodiment of the present invention, linear protection switching can be effectively performed in a point-to-multipoint network of a rooted multipoint connection form, and protection switching for traffic having a traffic attribute of multicast as well as unicast can be performed.

Particularly, a point-to-multipoint network of a rooted multipoint connection form is a network in which one root node and several leaf nodes are connected with several traffic paths of a tree form like a branch for data transmission. In such a network, when point-to-multipoint protection switching is performed, if damage occurs at one time at many branches or if damage occurs at a branch adjacent to a root node having many leaf nodes, by performing protection switching per tree, a processing load of the root node can be effectively prevented from rapidly increasing. As a result, faster protection switching is performed in a network of a point-to-multipoint form.

In an exemplary embodiment of the present invention, when a present mode is changed to a protection switching mode per leaf in a recovery process, by again driving each multiple global priority logic step with a finally received local request and far end request, state transition of each global priority logic step can be updated.

An exemplary embodiment of the present invention may not only be embodied through an apparatus and a method, but may also be embodied through a program that executes a function corresponding to a configuration of the exemplary embodiment of the present invention or through a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of performing protection switching in a network comprising a first node and a plurality of second nodes that are connected to the first node, the method comprising:
    counting a number of obstacles that have occurred in a plurality of paths that are connected between the first node and the plurality of second nodes;
    performing protection switching per leaf if the counted number is smaller than a predetermined threshold value; and
    performing protection switching per tree if the counted number is equal to or larger than a predetermined threshold value,
    where the first node and the plurality of second nodes are set and managed as a tree and each of the plurality of second nodes is a leaf of the tree.

2. The method of claim 1, further comprising:
    driving a path monitoring timer; and
    comparing the counted number with the threshold value before driving of the path monitoring timer has expired.

3. The method of claim 2, wherein the protection switching per leaf or the protection switching per tree is performed after the path monitoring timer has expired.

4. The method of claim 2, wherein the counting of the number comprises performing protection switching per leaf of the occurred obstacle after the number of obstacles that have occurred is counted.

5. The method of claim 1, wherein the counting of the number comprises:
    monitoring whether an obstacle occurs per path that is connected to each of the plurality of second nodes and acquiring a local request per second node;
    acquiring a far end request according to occurrence of an obstacle from each of the plurality of second nodes; and
    counting the number of obstacles that have occurred according to the local request or the far end request.

6. The method of claim 1, wherein a working tree path and at least one protection tree path are formed between the first node and each of the second nodes, the working tree path comprises a plurality of working paths, and the protection tree path comprises a plurality of protection paths.

7. The method of claim 6, wherein the performing of protection switching per leaf comprises performing protection switching to a protection path corresponding to a working path in which an obstacle has occurred per second node in which an obstacle has occurred, and
    the performing of protection switching per tree comprises switching a working tree path in which an obstacle has occurred to another protection tree path.

8. A method of performing protection switching in a network comprising a first node and a plurality of second nodes that are connected to the first node, the method comprising:
    counting the number of obstacles that have occurred in a plurality of paths that are connected between the first node and the plurality of second nodes;
    maintaining the first switching mode when a present protection switching mode is a first switching mode that performs protection switching per leaf, if the counted number is smaller than a preset first threshold value;
    converting, when a present protection switching mode is a first switching mode that performs protection switching per leaf, if the counted number is equal to or larger than the first threshold value, the present protection switching mode to a second switching mode that performs protection switching per tree;
    maintaining the second switching mode when a present protection switching mode is a second switching mode that performs protection switching per tree, if the counted number is equal to or larger than a preset second threshold value; and
    converting, when a present protection switching mode is a second switching mode that performs protection switching per tree, if the counted number is smaller than the second threshold value, the present protection switching mode to a first switching mode that performs protection switching per leaf;
    where the first node and the plurality of second nodes are set and managed as a tree and each of the plurality of second nodes is a leaf of the tree.

9. The method of claim 8, wherein the first threshold value and the second threshold value are the same.

10. The method of claim 8, wherein the first threshold value and the second threshold value are different.

11. The method of claim 8, wherein the counting of the number comprises counting the number of obstacles that have occurred for a preset monitoring period, and
    the counted number for the monitoring period is compared with the first threshold value or the second threshold value.

12. A protection switching apparatus in a network comprising a first node and a plurality of second nodes that are connected to the first node, wherein the protection switching apparatus runs on one or more processors, the protection switching apparatus comprising:
    a local state monitoring unit that monitors a state of each of a plurality of paths that are connected per second node and that detects whether an obstacle occurs and that outputs a local request according to occurrence of an obstacle;
    a multiple local priority determination unit that performs a local priority logic step for a plurality of local requests that are output per second node and that selects and outputs a local request having a top priority order per second node;
    a far end state monitoring unit that monitors whether a message according to each protection switching report is transmitted from the second node and that outputs a far end request according to a message that is received per second node; and
    a plurality of multiple global priority determination units that compare an input far end request or a local request having a top priority order with a global request having a present top priority order and that output a request having a higher priority order as a comparison result as a global request having a top priority order for performing protection switching and that correspond to each of the second nodes, wherein each multiple global priority determination unit receives and processes a local request and a far end request that are input from a corresponding second node, wherein when a number of obstacles that have occurred in the plurality of paths is equal to or larger than a predetermined threshold value, protection switching per tree is performed, where the first node and the plurality of second nodes are set and managed as a tree and each of the plurality of second nodes is a leaf of the tree.

13. The protection switching apparatus of claim 12, wherein the local request and the far end request comprise information about a path in which an obstacle has occurred, and the global request comprises information about a path to perform protection switching.

14. The protection switching apparatus of claim 12, wherein the plurality of multiple global priority determination units corresponding to each of a plurality of second nodes in which an obstacle has occurred operate to switch a path in which an obstacle has occurred per second node to another path, when a present protection switching mode is a first switching mode that performs protection switching per leaf.

15. The protection switching apparatus of claim 14, wherein one multiple global priority determination unit of a plurality of multiple global priority determination units is set as a representative global priority determination unit, and the representative global priority determination unit operates to switch a tree path comprising a path in which the obstacle has occurred to another corresponding tree path, when a present protection switching mode is a second switching mode that performs protection switching per tree.

16. The protection switching apparatus of claim 14, further comprising a representative global priority determination unit that switches a tree path comprising a path in which an obstacle has occurred to another corresponding path, when a present protection switching mode is a second switching mode that performs protection switching per tree.

17. The protection switching apparatus of claim 15, wherein the number of obstacles that have occurred based on the local request and the far end request is counted during a preset monitoring period, and if the counted number is smaller than a predetermined threshold value, the first switching mode is set, and if the counted number is equal to or larger than a predetermined threshold value, the second switching mode is set.

* * * * *